Feb. 25, 1947.   J. FERLA   2,416,618
PIPE
Filed Aug. 3, 1942
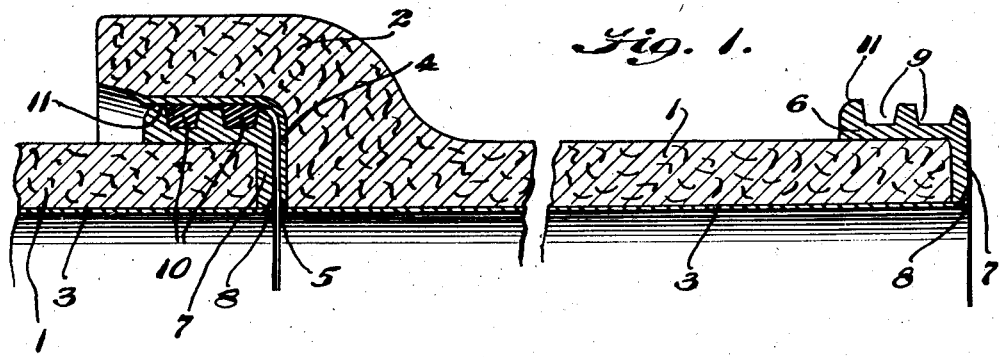
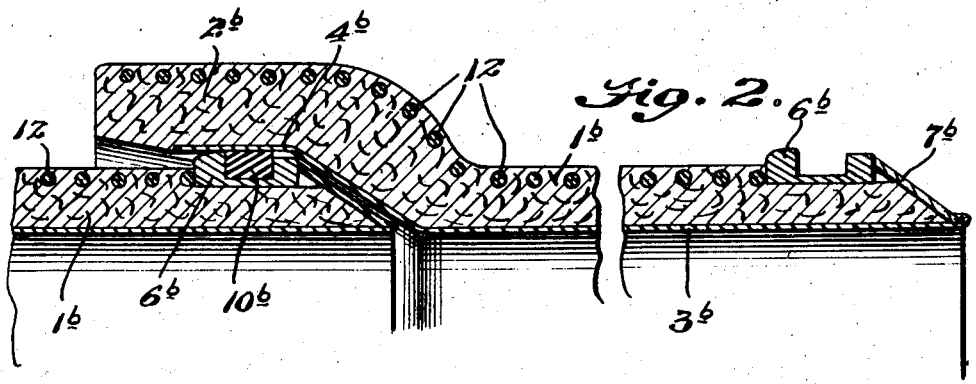
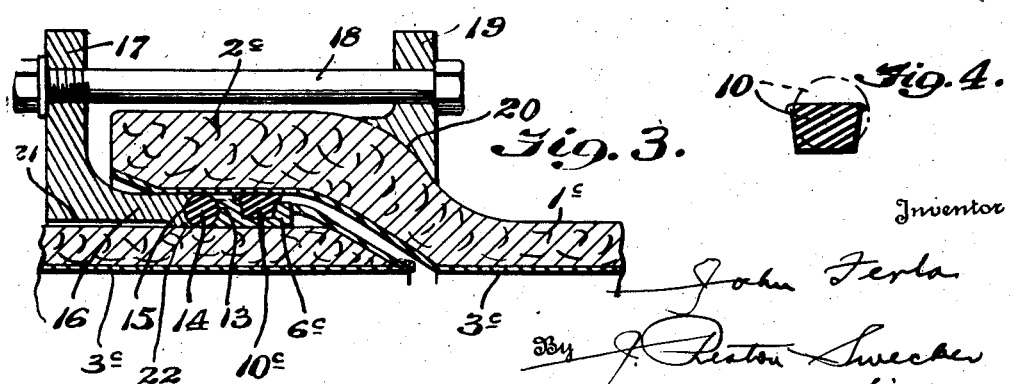
Inventor
John Ferla
By J. Preston Swecker
his Attorney Patented Feb. 25, 1947

2,416,618

UNITED STATES PATENT OFFICE 2,416,618

PIPE

John Ferla, East Orange, N. J., assignor to U. S. Asbestos Cement Pipe Company, Camden, N. J., a corporation of New Jersey Application August 3, 1942, Serial No. 453,447

4 Claims. (Cl. 285—112)

This application is a continuation-in-part of my prior application, Ser. No. 300,275, filed October 19, 1939, for Machine for producing pipes, now Patent No. 2,374,086, granted April 17, 1945, which was a division of my former application on Method of producing tubes, Ser. No. 184,509, filed January 12, 1938, now Patent No. 2,177,643, granted October 31, 1939.

This invention relates to an improvement in pipes, particularly such pipes as are formed of asbestos or other fibrous cementitious material.

One object of the invention is to provide a pipe constructed of asbestos cementitious material, having a bell formed integrally with the barrel of the pipe, so as to facilitate the juncture of sections of the pipe providing simple but effective couplings therebetween, without the necessity for the provision of separate and independent couplings which have been necessary heretofore.

A further object of the invention is to provide for the use of non-metallic pipes, such as are formed by asbestos cementitious material, for the transmission of hydrocarbon products, such as gasoline, fuel oil, natural gas, etc., which normally would penetrate to some extent into or through the wall of the pipe under the pressures normally used in pipe lines, but this can be prevented by a protective sheet or tube of metal or other suitable material covering the inner surface of the pipe, and of such character as will prevent penetration by the oil, gas, etc.

By forming the bell collar directly on the barrel of the pipe, integral therewith, the pipe is thus constructed with a strength substantially equal to that of steel pipe due to the knitting together of the wall structure by the asbestos fibers distributed throughout the cementitious material, which makes it practical for the pipe to be thus formed with the integral bell collar. This enables a joint to be provided with very little packing, by means of a gasket interposed between the barrel and the bell.

I have shown different embodiments of the invention in the accompanying drawings, in which:

Fig. 1 is a longitudinal section through a portion of a pipe embodying my invention;

Fig. 2 is a similar view of a modified form thereof;

Fig. 3 is a detailed sectional view through another form of joint construction; and Fig. 4 is a detailed cross section through a gasket.

The invention as shown in the embodiment set forth in Fig. 1, includes a pipe formed of asbestos cementitious material, which is formed with a barrel 1, at one end of which is a bell collar 2. These may be formed substantially in the manner set forth in my prior application, Ser. No. 184,509, filed January 12, 1938, now Patent No. 2,177,643, October 31, 1939. The process thus set forth in said application and patent includes the transfer of a layer of composition material, preferably containing asbestos or other fiber and cement, onto a mandrel, and successively applying additional layers thereto under pressure until the pipe is formed of suitable or desired wall thickness. Both the bell collar and the barrel are formed simultaneously of uniform composition, integral with each other so as to form one integral piece. The asbestos or other fibers distributed uniformly throughout the cementitious composition, both in the bell and barrel portions of the pipe, tie these parts together with a very great strength, sufficient for high pressure pipe, and insures the retention of the bell on the barrel against separation therefrom.

Due to the increased pressure to which the bell may be subjected, forming the joint of the pipe, it may be made of increased thickness, as shown in Fig. 1, to impart additional resistance thereto. One way of increasing the thickness of the bell relative to the barrel, after these have been formed initially of uniform wall thickness on a mandrel, is by an axial application of pressure to the end of the barrel expands the latter within a mold to the required wall thickness, thus imparting additional strength thereto.

In building the pipe on the apparatus set forth in my application, Ser. No. 247,507, filed December 23, 1938, now Patent No. 2,283,921, May 26, 1942, the mandrel to which the successive layers are applied, is first covered by a surrounding shell that receives the layers of asbestos cementitious composition thereon. The application of the composition on the shell bonds the material thereto, although the shell can be loosened therefrom and removed before the composition sets.

Where the pipe is to be used for the transmission of oil or gas, such as in a pipe line, the shell being formed of thin metallic material should be shaped so as to remain in the formed pipe and retain its bonded relation to the surrounding wall thereof. Such a shell is shown at 3 in Fig. 1, forming a lining for the pipe extending throughout the length of the barrel to the ends of the inner surface thereof. A similar lining is shown at 4 within the open end of the bell 2, also formed preferably of metallic material and covering the open face of said bell. These linings 3 and 4 may be joined together rigidly as by welding at the point 5.

At the opposite end of the barrel, a cap ring 6 is secured thereon over the end of the barrel and with an inturned flange 7 that extends over the face of said end of the barrel, being preferably welded to the lining 3 at 8.

The cap ring 6 is shown as formed with two annular grooves 9 in the outer periphery thereof to receive therein packing rings 10 which are thus interposed between the cap ring 6 and the lining 4 of the bell. Before insertion of the end of the barrel into the bell, the packing rings are initially substantially of round cross section as indicated by dotted lines in Fig. 4, but the parts are forced together under pressure so as to deform the packing rings 10 substantially to the flattened shape illustrated in Figs. 1 and 4. The inner side of the cap ring 6 at the periphery thereof is so formed at 11 to have a sliding fit with the inner face of the bell lining 4, but is rounded off in cross section so as not to have a bearing face which would interfere with the insertion of the cap ring into the bell. The substantial fit between these parts is sufficient to exclude air from the packing rings which might tend to deteriorate the same in use. This rounded side face also permits lateral deflection of one pipe section relative to the other as may be necessary to conform to the contour of the earth in which the pipe may be used.

The gaskets 10 may be formed of rubber, artificial rubber, or other suitable packing material, that will effectively seal the joint between the pipe sections. Where this pipe is used in an oil pipe line, the material of the gaskets should also be of such character as will not be affected by the oil or gas transmitted through the pipe. I have found that a plastic material having some of the characteristics of artificial rubber in its elasticity and yieldability, is materially advantageous for this purpose, inasmuch as it is not affected by the oil or gas transmitted through the line.

The lining 3, as well as the parts 4 and 6 applied to the pipe, are preferably constructed of steel or other suitable material having substantially the characteristics thereof which will form an effective joint and will not be affected by oil or gas, or permit penetration of such hydrocarbon substances into the asbestos and cement body of the pipe. By forming the body of the pipe directly on the lining as a mandrel, this lining is securely bonded to the asbestos and cement composition, so that it remains rigid therewith, and will not separate in service. At the same time it prevents any penetration by the petroleum products into the material forming the barrel and bell of the pipe.

If this lining be constructed of steel having a wall thickness no greater than approximately one-eighth inch, the expansion and contraction of the lining will be substantially equal to that of the asbestos and cement pipe and thereby no tendency for separation of these parts in service. At the same time, this is sufficient thickness to prevent penetration of the body of the pipe by oil or gas. The pressure in the line is held primarily by the asbestos and cement composition, which may be increased in thickness for increase in pressure, and the lining, if used, increases the service pressure and serves also to prevent penetration of the cementitious composition by the hydrocarbons.

Where two packing rings are used in series, as shown in Fig. 1, this doubles the sealing effect obtained thereby inasmuch as any fluid leaking past the first ring will be stopped by the second, thus doubling the life of the packing, and increasing the serviceability thereof.

In the form shown in Fig. 2, the barrel 1b is formed with an integral bell collar 2b substantially as described above, but after partial setting of the composition material, the barrel and bell are wrapped with prestressed wire of high tensile strength, as shown at 12, the convolutions of which wire are then embedded by being covered with additional material of similar composition and the entire pipe then allowed to set and season to the required extent for high pressure pipe.

In this form also the lining 3b extends continuously throughout the length of the barrel and along the inner surface of the bell, as shown at 4b, forming one continuous covering therefor. A ring 6b is applied over the end of the barrel to receive and retain the packing ring 10b, of which one ring only is shown and may be used if desired, depending upon the pressures and fluids to be transmitted through the pipe. The free end of the barrel 1b is covered by a flange 7b which is shown as separate from the ring 6b, although it may be formed integral therewith, if desired. These metallic parts may be welded or otherwise rigidly secured together to prevent seepage through the cracks therebetween.

In the form shown in Fig. 3, the barrel 1c is covered by a lining 3c which extends continuously along the inner face of the bell 2c, substantially as described in connection with Fig. 2. The ring 6c that holds the packing ring 10c has a concave face 13 to receive thereagainst a second packing ring. The latter is usually oval in cross section but is compressed between the concave circumferential groove 13 and a similar groove 15 substantially to fit the space between the barrel and bell and prevent leakage therebetween. The groove 15 is formed in an inturned portion 16 of a flange 17 which surrounds the barrel at the joint and is secured by bolts 18 with a corresponding flange 19. The latter flange, which also surrounds the pipe on the opposite side of the bell 2c from the flange 17, has a face 20 to fit the contour of the bell. By drawing up the bolts 18, the parts of the packing may be subjected to pressure which will effectively prevent leakage at the gasket 14 even under very high pressures which may be encountered in some pipe lines.

The inturned portion 16 of the flange 17 has a groove 21 in the under face thereof that extends substantially throughout the inner wall of said flange, leaving a relatively narrow rib at the inner end of the flange in position to bear against the outer periphery of the barrel portion 1c. Thus the flange does not bear on the periphery of the pipe barrel throughout its width, which allows for flexibility at the point, permitting tilting of the flange 17 relative to the pipe barrel 1c, due to the small bearing contact therewith. In the event of the tilting of the flange 17 relative to the left hand pipe section 3c in Fig. 3, the flange 19 remaining parallel with the flange 17 may be adjusted to a different position with respect to the bell 2c. This allows substantial flexibility at the joint permitting adjustment of the pipe sections to different relative positions, and coupled in rigid secure relationship.

Although the lining shown and described is preferably constructed of thin steel tubing, if steel is not available for this purpose, such a lining may be formed of other material that will prevent penetration of oil and gas into the cementitious composition or formed as a coating of suitable material on the inner wall thereof.

I claim:
1. In a pipe joint, the combination of pipe sections including an interfitting bell and barrel spaced from each other, means forming a circumferential groove between the bell and barrel, an elastic gasket mounted in said groove and compressed between the bell and barrel forming a fluid-tight connection therebetween, flanges surrounding said sections on respective opposite sides of the bell, said bell having a peripheral portion at one side thereof convex in cross section, one of said flanges having a concave inner surface in pressure bearing relation with the convex side portion of the bell and the other of said flanges having pressure bearing relation with the gasket, and means connecting said flanges together for drawing the same toward each other to prevent displacement of the gasket.

2. In a pipe joint, the combination of pipe sections formed of asbestos cementitious material and including an interfitting bell and barrel spaced from each other, means on said barrel forming a plurality of circumferential grooves arranged in side-by-side relation and spaced apart lengthwise of the axis of the sections, elastic gaskets mounted in said grooves and compressed between the same and the barrel forming a fluid tight connection therebetween, flanges surrounding said sections on respective opposite sides of the bell, said bell having a peripheral portion at one side thereof convex in cross-section, one of said flanges having a concave inner surface in pressure bearing relation with the convex side portion of the bell and the other of said flanges having pressure bearing relation with the outermost one of the gaskets, and means connecting said flanges together for drawing the same toward each other to prevent displacement of the last-mentioned gasket.

3. In a pipe joint, the combination of pipe sections formed of cementitious material and including an inerfitting bell and barrel, a metallic lining extending continuously through the barrel, a metallic sleeve telescoped over the barrel and having a plurality of circumferential grooves arranged in side-by-side relation in the periphery thereof within the bell, metallic means connected with said sleeve and extending over the end portion of the barrel and joined to the lining, and elastic gaskets compressed in said grooves between the bell and barrel.

4. In a pipe joint, the combination of pipe sections formed of cementitious material and including an interfitting bell and barrel, a metallic lining extending continuously through the barrel, a metallic sleeve telescoped over the barrel and having a circumferential groove arranged in the periphery thereof within the bell, metallic means connected with said sleeve and extending over the end portion of the barrel and joined to the lining, and an elastic gasket compressed in said groove between the bell and the barrel.

JOHN FERLA.

REFERENCES CITED

The following references are of record in the file of this patent:

UNITED STATES PATENTS

| Number | Name | Date |
| --- | --- | --- |
| 1,910,643 | Sherrard | May 23, 1933 |
| 2,280,786 | Boynton | Apr. 28, 1942 |
| 2,226,067 | Morgan | Dec. 24, 1940 |
| 1,976,589 | Trickey | Oct. 9, 1934 |
| 2,031,057 | Mitchell | Feb. 18, 1936 |
| 779,169 | Mac Donald | Jan. 3, 1905 |
| 2,209,547 | Whitacre | July 30, 1940 |
| 2,158,829 | Miller | May 16, 1939 |
| 874,390 | Carel | Dec. 24, 1907 |
| 2,323,179 | Hall et al. | June 29, 1943 |
| 2,008,074 | Isman | July 16, 1935 |
| 1,931,024 | Howard | Oct. 17, 1933 |

FOREIGN PATENTS

| Number | Country | Date |
| --- | --- | --- |
| 808,647 | France | Nov. 14, 1936 |
| 644,601 | Germany | Apr. 15, 1937 |
| 416,816 | Germany | Jan. 28, 1923 |
| 808,647 | France | Nov. 14, 1936 |
| 5,612 | Australia | Sept. 27, 1932 |
| 637,035 | Germany | Oct. 19, 1936 |